United States Patent Office

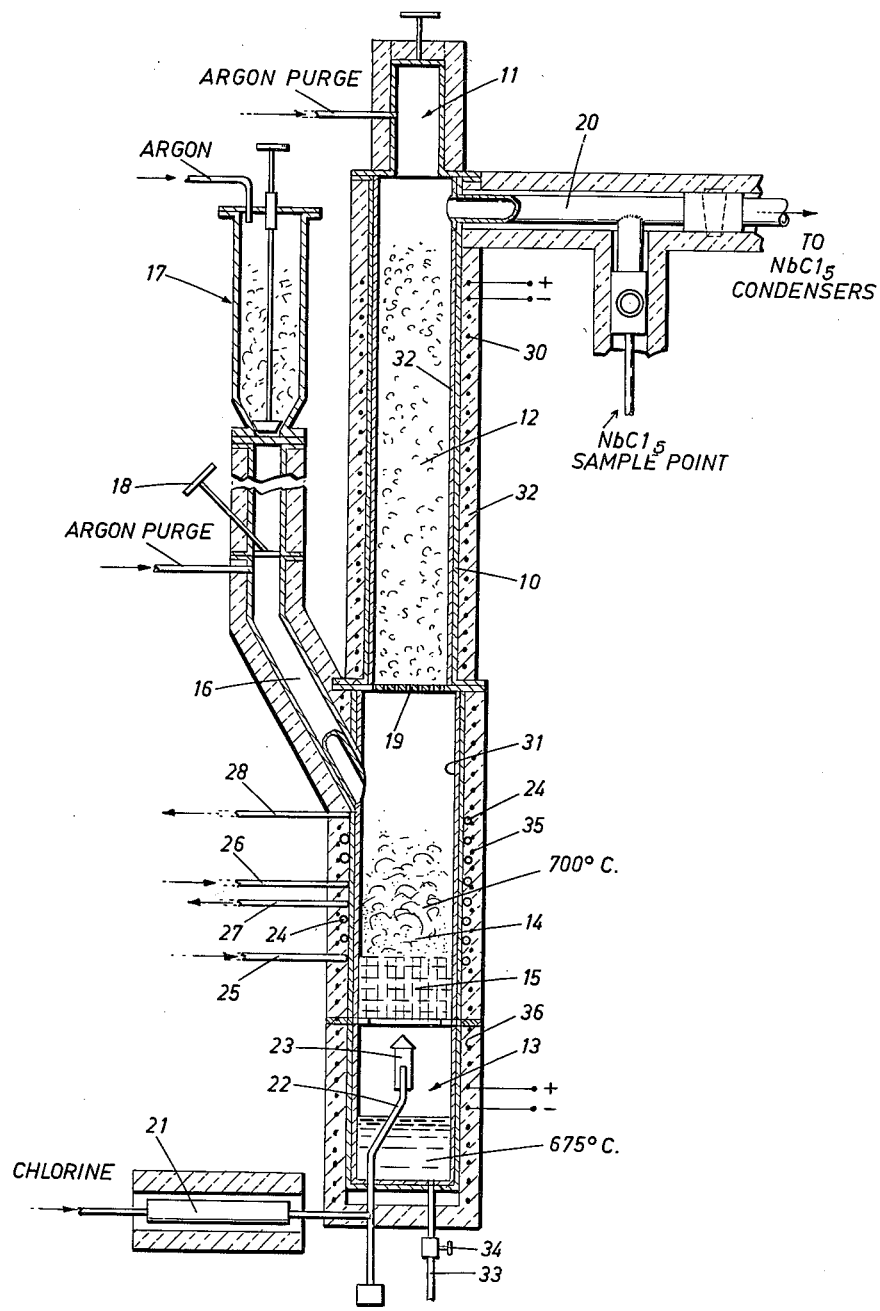

3,085,855
Patented Apr. 16, 1963

3,085,855
PROCESS FOR THE PRODUCTION OF NIOBIUM PENTACHLORIDE
Charles Alexander Sutherland and Arnold George White, both of Trail, British Columbia, Canada, assignors to The Consolidated Mining and Smelting Company of Canada Limited, Montreal, Quebec, Canada, a company of Canada
Filed Mar. 15, 1961, Ser. No. 95,839
2 Claims. (Cl. 23—87)

This invention relates to a process and apparatus for the production of metal chlorides. It is directed to an improvement in the method of producing niobium pentachloride from ferro-niobium and is particularly applicable to the production of niobium pentachloride from an ore, or a concentrate of an ore, of niobium, such as pyrochlore.

Methods are now known for the production of niobium metal from pyrochlore and columbite. Such methods involve treating the ore, or a concentrate of an ore, in a first stage to form a crude, ferro-niobium alloy. In the second stage, the ferro-niobium alloy is chlorinated with chlorine gas to convert the niobium content to niobium pentachloride, $NbCl_5$, which is separated as a volatile chloride from the reaction mass, and recovered therefrom by condensation and fractional distillation of the volatile chlorides. The recovered niobium pentachloride can be reduced to niobium metal by known procedures.

Problems are encountered in the operation of the first two stages of the overall process which affect, adversely, the cost and the purity of the niobium metal. For example, care must be taken in the first stage to ensure the production of a crude ferro-niobium alloy which contains no or substantially no oxygen. Oxygen present in the crude alloy, for example in the form of oxides, results in the formation of niobium oxychloride in the chlorinating stage. The oxychloride is difficult to handle and to separate from the pentachloride and, also, results in the contamination with oxygen of the metal produced on reducing the niobium pentachloride to niobium product metal.

A further problem is encountered in the chlorination stage. The efficiency of that stage depends on maintaining a bed ferro-niobium pieces in a highly porous state to permit the free flow of chlorine gas therethrough with maximum contact with exposed surfaces of the pieces. Volatile chlorides are formed in the chlorinating reaction, including ferric chloride, ferrous chloride, and niobium pentachloride. As shown in the prior art, ferric chloride can be removed from other volatile chlorides by passing gases from a chlorination reactor to a separate vessel containing a porous bed of sodium chloride. The ferric chloride, on contact with sodium chloride, forms a liquid ferric chloride-sodium chloride mixture which is highly fluid at the vaporization temperature of niobium pentachloride, about 249° C. Consequently, the ferric chloride in the gases removed from the reactor can be condensed and trapped in the salt bed.

However, the presence of ferrous chloride in the chlorination zone of the reactor causes a serious problem which the prior art methods do not overcome. Ferrous chloride has a melting point of about 670° C. and evaporates at a little above that temperature. Thus, in part it forms a viscous liquid in the chlorination zone which clogs the pores of the reaction mass, and, in part, evaporates to form encrustations on the wall of the reactor and thus prevents the free flow of chlorine gas through the reaction mass and makes continuous operation of the chlorinating stage very difficult, if not impossible.

We have found that operating difficulties in the chlorinating stage of the process caused by the presence of ferrous chloride can be overcome by incorporating a sodium chloride bed within the chlorination reactor and positioned vertically above the chlorinating zone in the reactor so that volatile chlorides formed in the chlorinating zone rise into the sodium chloride bed where ferric chloride forms a low melting point liquid with the salt. This ferric chloride-sodium chloride liquid percolates downwardly through the salt bed and then into and through the chlorinating bed to a collecting zone located below the chlorinating zone. We have found that ferrous chloride dissolves in the ferric chloride-sodium chloride liquid. In passing through the salt bed and chlorinating zone, the liquid washes any sublimed or viscous ferrous chloride from the salt bed and chlorinating bed, and any encrustations of ferrous chloride from the walls of the reactor. In our process, therefore, ferrous chloride is removed from the salt bed and chlorinating bed before it can accumulate in amount sufficient to cause difficulty; thus, we can achieve rapid and complete chlorination of the charge on a continuous basis.

The process of this invention for the production of niobium pentachloride comprises the steps of reacting in a chlorinating zone a porous bed of ferro-niobium pieces with chlorine gas to form a gas stream which contains ferric chloride and niobium pentachloride as volatile chlorides with concurrent formation of ferrous chloride, passing the stream of volatile chlorides upwardly through a porous bed of sodium chloride pieces positioned above the chlorinating zone and maintained at a temperature above the vaporization temperature of niobium pentachloride but below the melting temperature of ferrous chloride, and withdrawing volatile chlorides substantially free from ferrous and ferric chlorides from said sodium chloride salt bed.

An understanding of the process and the apparatus which form the subject matter of this invention can be obtained from the following description, reference being made to the accompanying drawing which is a front view of the reactor illustrated partly in section and partly schematically.

Like reference characters refer to like parts throughout the description and the drawing.

The reactor illustrated in the drawing is in the form of a vertical column which conveniently can be formed of a nickel shell 10 with a protective lining. It is fitted with a valved top or cap 11 through which sodium chloride pieces can be charged as required to maintain the salt bed 12 of required depth.

The reactor is divided generally into three zones vertically spaced from each other, a ferrous chloride-ferric chloride-sodium chloride liquid collection zone 13 in the lower part; a porous bed of crude ferro-niobium metal alloy pieces 14 carried on a perforated silica support 15 spaced above the collection zone 13; and a porous salt bed 12 of sodium chloride pieces positioned vertically above the chlorinating zone and spaced therefrom. An inlet port 16 is provided between the chlorinating zone and the salt bed for feeding pieces of crude ferro-niobium into the chlorinating zone, for example from a hopper 17. The inlet port 16 is provided with a valve 18 which normally is closed during the chlorinating operation but can be opened to admit charge material from the hopper 17. The hopper 17 can be used to feed ferro-niobium to the chlorinating zone through port 16, and sodium chloride to the salt bed through port 11 as required.

The salt bed 12 is carried on a perforated silica support 19.

Volatile chlorides which rise through the salt bed 12 are withdrawn from the reactor and passed through conduit 20 to condensers, not shown.

Chlorine gas, preferably preheated in preheater 21, is fed into the reactor through pipe line 22 which terminates in an upstanding nozzle or sparger 23 below the bed of ferro-niobium pieces.

Cooling coils 24 are provided around the reactor throughout the length of the chlorinating zone. Air fed into the coils through inlets 25—26 and discharged from outlets 27—28 can be used as the cooling medium for the reactor shell.

Electric heating jackets 30, 35 and 36 are provided around the reactor throughout the length of the sodium chloride salt bed, the ferro-niobium bed and the collection zone. They are used to control temperatures during operation of the process and to preheat the reactor at the start of operations.

The reactor, preferably, is protected from corrosion, for example by a silica liner 31 for the chlorinating and collecting zones and a borosilicate glass liner 32 for the salt bed zone.

A drain pipe 33, normally closed by a valve 34, is provided at the bottom of the reactor for draining the liquid, ferrous chloride-ferric chloride-sodium chloride melt which continuously flows into that zone during the operation of the chlorinating process.

The operation of the process is relatively simple. Methods are now known for preparing crude ferro-niobium which is free, or substantially free, from oxides. For example, columbite, which is a niobium-iron-oxygen compound, can be mixed, in the form of an ore or an ore concentrate, with finely divided aluminum and ignited in a thermite reaction in which the niobium and iron oxides are reduced to a crude ferro-niobium alloy. The product of this reaction is a button which can be broken into pieces of a size suitable for charging into the reactor.

Pyrochlore is a niobium-calcium-oxygen compound which, usually, contains titanium and alkali metals. A ferro-niobium product is obtained when an ore or an ore concentrate which contains pyrochlore is mixed with finely divided aluminum, iron oxide and, if necessary, a slag forming constituent such as fluorspar, and ignited. The aluminum is provided in amount sufficient to reduce the niobium and iron oxides to the metallic state in the form of a ferro-niobium alloy. The amount of iron oxide in the mixture should be sufficient to provide the heat required to melt the charge and produce separate layers of slag and metal. The charge mixture is charged into a crucible, preferably with a piece of solid aluminum on the bottom to ensure complete de-oxidation of the ferro-niobium, and is ignited. The thermite reaction proceeds rapidly at a temperature above about 1500° C. and usually is completed within one to two minutes. The ferro-niobium metal contains about 80% to 90% of the niobium contained in the charge material. The metal and slag can be easily separated, and the metal is then broken into pieces of a size suitable for charging into the reactor, for example, from ¾ inch to 1 inch in size.

The ferro-niobium pieces are charged through the inlet port 16 into the reactor wherein they are carried as a bed on the perforated silica support rings 15. The sodium chloride salt bed is carried by a silica support 19 positioned vertically above the inlet port 16. The salt for this bed should be anhydrous and to ensure this, commercial grade salt can be melted and solidified. The salt, preferably in the form of lumps of from about ¼ to ¾ inch in size, is charged into the reactor through the port 11 as required to maintain a bed of suitable depth. The reactor is then flushed with an inert gas, such as argon, to remove all traces of oxygen and water vapour prior to the initiation of the chlorinating reaction. Chlorine, preferably preheated, is fed into the reactor from a point below the bed of ferro-niobium alloy pieces.

The chlorinating reaction is highly exothermic and tends to proceed very rapidly. The temperature rises rapidly to above 700° C. which is above the vapourization temperature of ferric chloride and niobium pentachloride and the melting point of ferrous chloride, about 670° C. The temperature of the chlorinating reaction can be controlled to obtain optimum results by regulating the flow of chlorine gas. The cooling coils 24 are provided to control the temperature of the shell 10 to below about 500° C. to minimize corrosion.

All the constituents of the crude ferro-niobium alloy excepting iron and including, but not necessarily limited to, niobium, titanium, silicon, aluminum and, if present in the starting material, tantalum, are converted to volatile chlorides. A portion of the iron is converted to volatile ferric chloride, $FeCl_3$, and the remainder to ferrous chloride, possibly as a result of the reduction of ferric chloride with metal. The ferrous chloride is only partly volatile under normal operating temperatures of, for example, from about 600° to 1000° C.

The ferric chloride is absorbed by the sodium chloride as the volatile chlorides rise from the chlorinating zone into and through the salt bed and forms a molten, relatively fluid, ferric chloride-sodium chloride mixture. Ferrous chloride from the chlorination bed which evaporates and rises into the salt bed is dissolved and washed from the salt bed by the fluid, ferric chloride-sodium chloride solution which percolates downwardly from the salt bed into and through the chlorination bed and into the collection zone 13. As the fluid solution mixture drains through the salt bed and the chlorination bed, it acts as a flux or solvent for the ferrous chloride and washes it from the salt bed, the chlorination bed and the wall of the reactor.

The reservoir in the collection zone can be drained continuously or intermittently as desired through the valved outlet pipe 33.

The salt bed is maintained at a temperature below the sublimation temperature of ferrous chloride and above the vapourization temperature of niobium pentachloride, preferably about 400° C., by the heating jacket 30. Thus, any ferrous chloride vapour contained in the volatile chlorides from the chlorinating bed is condensed and trapped in the salt bed. Niobium and tantalum pentachloride and titanium and silicon tetrachloride are volatile within this temperature range and pass through the salt bed. Any aluminum chloride present in the volatile chlorides is absorbed in the salt bed and removed with the liquid ferrous-ferric-sodium-chloride mixture drained therefrom.

The liquid in the reservoir in the collection zone is maintained, by heating jacket 36 if necessary at from about 600° to 650° C., at which temperature it is in a fluid condition. It will be understood, of course, that it is not necessary to collect this fluid solution in a collection zone below the chlorinating zone. It can, if desired, be drained directly from the reactor as it percolates through the collection zone and passed to waste or to a recovery zone remote from the reactor.

Methods for the separation of niobium pentachloride from other volatile chlorides, such as titanium and tantalum chlorides, are known and form no part of this invention. Volatile chlorides which pass through the salt bed are withdrawn from the reactor through the pipe line 20 and pass first through a "liquid" condenser and then through a cooled "solid" condenser. These condensers are not shown in the drawing. The "liquid" condenser is maintained at a temperature of about 210° C. whereby the niobium and tantalum chlorides are condensed as liquids and withdrawn for subsequent treatments. The remaining chlorides, together with uncondensed niobium and tantalum chlorides, pass to the cooled "solid" condenser which is maintained at about 90° C. The chlorides deposit on the wall of this condenser in solid form. Usually, two "solid" condensers are used in parallel and are operated alternately. The solid chlorides are melted and withdrawn from the "solid" condenser. The product recovered from the "liquid" condenser can be combined, if desired, with the product from the "solid" condenser for distillation, or the two condenser products can be distilled separately. Other chlorides, for example, titanium tetrachloride and silicon tetrachloride, can be recovered from the tail gas from the "solid" condenser if desired. Also, unreacted chlorine can be recovered, if desired. The niobium pentachloride product is free of oxychloride but will contain tantalum pentachloride if tantalum was present in the original starting material. Niobium and tantalum pentachlorides can be separated by fractional distillation for the recovery of these compounds in pure form.

The following tables give the results obtained in a reactor 3.5 inches in diameter with a chlorination bed 6 inches deep and a salt bed maintained about 24 inches deep fed intermittently as the operation continued by the addition of sodium chloride pieces as required, and illustrate the results which can be obtained in the operation of the process and apparatus of this invention:

TABLE 1

| Concentrate Analysis | $Nb_2O_5$, percent | $Ta_2O_5$, percent | $Fe_2O_3$, percent | FeO, percent | $SiO_2$, percent | $TiO_2$, percent |
|---|---|---|---|---|---|---|
| 1. Pyrochlore (i) | 21.7 |  | 11.1 |  | 26.5 | 4.7 |
| 2. Pyrochlore (ii) | 33.0 |  | 11.5 |  | 19.0 | 8.3 |
| 3. Columbite (iii) | 61.0 | 7.0 |  | 16.7 | 3.0 | 4.7 |

TABLE 2

*Thermite Reaction Charge Composition in Grams*

| Concentrate | Iron Oxide | Powdered Aluminum | Fluorspar | Solid Aluminum |
|---|---|---|---|---|
| (i) 4,000 | 1,503 | 1,525 | 400 | 44 |
| (ii) 4,000 | 1,412 | 1,616 | 400 | 52 |
| (iii) 4,000 |  | 1,256 | 400 | 53 |

TABLE 3

*Thermite Reaction Products*

| Concentrate | Wt. of Concentrate, g. | Wt. of Slag, g. | Wt. of Fe-Nb alloy, g. |
|---|---|---|---|
| (i) | 19,620 | 24,324 | 10,016 |
| (ii) | 20,000 | 25,829 | 10,770 |
| (iii) | 11,000 | 8,450 | 7,230 |

TABLE 4

*Slag Composition*

| Concentrate | $Nb_2O_5$, percent | $Ta_2O_5$, percent | $Fe_2O_3$, percent | $SiO_2$, percent | $TiO_2$, percent |
|---|---|---|---|---|---|
| (i) | 2.76 |  | 5.75 | 9.3 | 2.16 |
| (ii) | 5.65 |  | 8.8 | 5.3 | 3.4 |
| (iii) | 8.2 | 3.6 | 2.9 | 0.8 | 4.0 |

TABLE 5

*Ferro-Niobium Alloy Composition*

| Concentrate | Nb, percent | Ta, percent | Fe, percent | Si, percent | Ti, percent |
|---|---|---|---|---|---|
| (i) | 23.9 |  | 51.0 | 8.7 | 3.4 |
| (ii) | 33.6 |  | 45.6 | 8.8 | 5.0 |
| (iii) | 60.8 | 4.6 | 17.8 | 0.7 | 0.1 |
| (iv) commercial Fe-Nb | 48.9 | 5.4 | 34.2 | 0.2 | 0.6 |

NOTE.—Residual aluminum and other minor elements have not been included in the composition assays.

TABLE 6

*Chlorination Test Results*

| Concentrate | Wt. of Alloy Reacted, lb. | Wt. of $NbCl_5$ ($+TaCl_5$), lb. | Wt. of $FeCl_3=NaCl=FeCl_2$, lb. | Wt. of $Cl_2$ Used, lb. | Wt. of NaCl Used, lb. |
|---|---|---|---|---|---|
| (i) | 15.2 | 10.54 | 24.7 | 38.7 | 4.1 |
| (ii) | 13.5 | 12.4 | 30.2 | 44.1 | 13.5 |
| (iii) | 12.0 | 20.7 | 9.3 | 28.5 | 3.2 |
| (iv) | 9.0 | 12.5 | 12.6 | 20.25 | 4.5 |

NOTE.—Rate of chlorine input in each case was about 4 pounds per hour.

TABLE 7

*Composition of $FeCl_3:NaCl:FeCl_2$ Mixture*

| | Fe(ous), Percent | Fe(ic), Percent | Total Chlorine, Percent |
|---|---|---|---|
| (i) | 29.6 | 5.7 | 58.3 |
| (ii) | 11.7 | 9.9 | 60.9 |
| (iii) | 1.1 | 21.7 | 63.7 |
| (iv) | 2.8 | 20.1 | 63.2 |

In the above tests, the overall recovery of niobium and tantalum as $NbCl_5$ and $TaCl_5$ was between 75% and 85%. The recovery of niobium and tantalum from the alloy in the chlorinating stage ranged from 94% to virtually complete recovery. Niobium pentachloride condensed from the reactor contained less than 0.1% iron, and the iron content is further reduced in separating and recovering the niobium pentachloride by distillation.

The process of this invention possesses a number of important advantages. For example, the chlorinating reaction can be conducted rapidly and efficiently without encountering operating difficulties which otherwise result from the presence of ferrous chloride in the volatile chlorides produced in the chlorinating reaction. Also, the chlorinating reaction can be conducted as a continuous operation if so desired. The apparatus involved is relatively simple and compact and can be operated on a continuous or semi-continuous basis.

It will be understood, of course, that modifications can be made in the preferred embodiment of the invention described and illustrated herein without departing from the scope of the invention as defined by the appended claims.

What we claim as new and desired to protect by Letters Patent of the United States is:

1. In a process for the production of niobium pentachloride in which chlorine gas is passed through a porous bed of ferro-niobium in a chlorinating zone maintained at a temperature above 600° C. whereby a stream of volatile chlorides including niobium pentachloride and ferric chloride is formed and the stream of volatile chlorides is passed into contact with sodium chloride whereby a molten salt mixture comprising sodium chloride and ferric chloride is formed in said bed of sodium chloride, the improvement which comprises the steps of passing the stream of volatile chlorides from the chlorinating zone into a sodium chloride bed positioned vertically above said chlorinating zone, maintaining said sodium chloride bed at a temperature within the range of from about 249° C. to about 670° C., passing the molten salt mixture formed in said sodium chloride bed vertically downwardly on to the ferro-niobium bed in said chlorinating zone, passing said molten salt mixture through said ferro-niobium bed, collecting the molten salt mixture comprising sodium chloride, ferric chloride and ferrous chloride from below said ferro-niobium bed, withdrawing volatile chlorides substantially free from ferrous chloride and ferric chloride from above said sodium chloride bed, and separating and recovering niobium pentachloride from said withdrawn volatile chlorides.

2. The process according to claim 1 in which the ferro-niobium contains tantalum, and tantalum pentachloride and niobium pentachloride are recovered from the volatile chlorides withdrawn from the sodium chloride bed.

References Cited in the file of this patent
UNITED STATES PATENTS

| | | |
|---|---|---|
| 2,666,526 | Odell et al. | Jan. 19, 1954 |
| 2,697,115 | Clower et al. | Dec. 14, 1954 |
| 2,744,060 | Eaton | May 1, 1956 |
| 2,789,034 | Swaine et al. | Apr. 16, 1957 |
| 2,835,559 | Bahr | May 20, 1958 |
| 2,867,506 | Roberts | Jan. 6, 1959 |
| 2,904,404 | Ellis | Sept. 15, 1959 |
| 2,928,722 | Scheller | Mar. 15, 1960 |
| 2,934,426 | Mayer | Apr. 26, 1960 |
| 2,974,007 | Scheller | Mar. 7, 1961 |